(12) United States Patent
Chatterjee et al.

(10) Patent No.: US 7,809,892 B1
(45) Date of Patent: Oct. 5, 2010

(54) ASYNCHRONOUS DATA REPLICATION

(75) Inventors: Paresh Chatterjee, Fremont, CA (US);
Vijayarankan Muthirisavenugopal, Chennai (IN); Suresh Grandhi, Fremont, CA (US); Anandh Mahalingam, Fremont, CA (US)

(73) Assignee: American Megatrends Inc., Norcross, GA (US)

( * ) Notice: Subject to any disclaimer, the term of this patent is extended or adjusted under 35 U.S.C. 154(b) by 181 days.

(21) Appl. No.: 11/695,854

(22) Filed: Apr. 3, 2007

Related U.S. Application Data

(60) Provisional application No. 60/788,613, filed on Apr. 3, 2006, provisional application No. 60/788,625, filed on Apr. 3, 2006.

(51) Int. Cl.
*G06F 12/08* (2006.01)
(52) U.S. Cl. .......................... 711/143; 711/167; 711/162
(58) Field of Classification Search .............. 711/162, 711/161, 165, 112, 114; 714/6
See application file for complete search history.

(56) References Cited

U.S. PATENT DOCUMENTS

| | | | |
|---|---|---|---|
| 4,849,978 A | 7/1989 | Dishon et al. | |
| 4,942,579 A | 7/1990 | Goodlander et al. | |
| 5,257,367 A | 10/1993 | Goodlander et al. | |
| 5,524,204 A | 6/1996 | Verdoorn, Jr. | |
| 5,604,862 A | 2/1997 | Midgely et al. | |
| 5,678,061 A | 10/1997 | Mourad | |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,907,849 A | 5/1999 | Dias et al. | |
| 6,098,128 A | 8/2000 | Velez-McCaskey et al. | |
| 6,105,122 A | 8/2000 | Muller et al. | |
| 6,108,748 A | 8/2000 | Ofek et al. | |
| 6,128,654 A * | 10/2000 | Runaldue et al. ............ | 709/219 |
| 6,282,619 B1 | 8/2001 | Islam et al. | |
| 6,289,398 B1 | 9/2001 | Stallmo et al. | |
| 6,434,681 B1 | 8/2002 | Armangau | |

(Continued)

OTHER PUBLICATIONS

Intel (Publisher). "PRO/10 Adapter: Reducing Bottlenecks for Maximum Performance". 2004. URL: http://www.intel.com/support/network/adapter/pro100/sb/cs-010531.htm.*

(Continued)

*Primary Examiner*—Pierre-Michel Bataille
(74) *Attorney, Agent, or Firm*—Aaronson & Waldman, LLC

(57) ABSTRACT

Technologies are provided herein for asynchronous data replication. A primary server maintains and exposes a storage volume for use by storage clients. The primary server receives write operations directed toward the storage volume and performs the writes on the storage volume. The primary server also creates buckets containing each of the write operations. The buckets are opened at a first point in time and closed at a second point in time that may be selected based upon the contents of the buckets, a predefined time period, or based upon an indication from an application program. The buckets are transmitted to a second server computer asynchronously. When each bucket is received completely by the second server, its contents are written to a storage volume maintained by the second computer. The buckets may be created from pages of a write-back cache utilizing a zero buffer copy mechanism.

18 Claims, 7 Drawing Sheets

U.S. PATENT DOCUMENTS

| | | | |
|---|---|---|---|
| 6,487,561 | B1 | 11/2002 | Ofek et al. |
| 6,502,166 | B1 | 12/2002 | Cassidy |
| 6,671,757 | B1 | 12/2003 | Mutler et al. |
| 6,694,336 | B1 | 2/2004 | Multer et al. |
| 6,826,711 | B2 | 11/2004 | Moulton et al. |
| 7,069,385 | B2 | 6/2006 | Fujimoto et al. |
| 7,089,448 | B2 | 8/2006 | Hinshaw et al. |
| 7,155,466 | B2 | 12/2006 | Rodriguez et al. |
| 7,159,150 | B2 | 1/2007 | Kenchammana-Hosekote et al. |
| 7,231,493 | B2 | 6/2007 | Nguyen et al. |
| 7,315,958 | B1 | 1/2008 | Bridge, Jr. |
| 7,415,486 | B2 | 8/2008 | Mutler |
| 7,457,980 | B2 | 11/2008 | Yang et al. |
| 2002/0029227 | A1 | 3/2002 | Multer et al. |
| 2002/0040369 | A1 | 4/2002 | Multer et al. |
| 2002/0059540 | A1 | 5/2002 | Mann et al. |
| 2003/0088803 | A1 | 5/2003 | Arnott et al. |
| 2003/0105923 | A1 | 6/2003 | Bak et al. |
| 2003/0221063 | A1 | 11/2003 | Eguchi et al. |
| 2004/0073831 | A1 | 4/2004 | Yanai et al. |
| 2004/0088483 | A1 | 5/2004 | Chatterjee et al. |
| 2004/0250031 | A1* | 12/2004 | Ji et al. ................. 711/162 |
| 2005/0091391 | A1* | 4/2005 | Burton et al. ........... 711/162 |
| 2005/0102551 | A1 | 5/2005 | Watanabe |
| 2005/0114350 | A1 | 5/2005 | Rose et al. |
| 2005/0228957 | A1 | 10/2005 | Satoyama et al. |
| 2005/0273565 | A1* | 12/2005 | Hirakawa et al. ......... 711/162 |
| 2006/0206542 | A1 | 9/2006 | Wolfgang et al. |
| 2006/0236047 | A1 | 10/2006 | Shitomi |
| 2007/0150677 | A1 | 6/2007 | Homma et al. |
| 2008/0052480 | A1 | 2/2008 | Satoyama et al. |
| 2008/0104443 | A1 | 5/2008 | Akutsu et al. |
| 2008/0244205 | A1 | 10/2008 | Amano et al. |
| 2009/0044046 | A1 | 2/2009 | Yamasaki |
| 2009/0055608 | A1 | 2/2009 | Yamasaki |

OTHER PUBLICATIONS

U.S. Official Action dated Mar. 16, 2009 in U.S. Appl. No. 11/551,303.
U.S. Official Action dated Dec. 23, 2008 in U.S. Appl. No. 11/551,311.
U.S. Appl. No. 11/551,291, filed Oct. 20, 2006, entitled "Providing Redundancy in a Storage System," Inventors: Chatterjee et al.
U.S. Appl. No. 11/551,303, filed Oct. 20, 2006, entitled "Background Movement of Data Between Nodes in a Storage Cluster," Inventors: Chatterjee et al.
U.S. Appl. No. 11/551,311, filed Oct. 20, 2006, entitled "Distributed Hot-Spare Storage in a Storage Cluster," Inventors: Chatterjee et al.
U.S. Appl. No. 11/695,673, filed Apr. 3, 2007, entitled "Snapshot-Assisted Data Replication," Inventors: Chatterjee et al.
U.S. Appl. No. 12/013,110, filed Jan. 11, 2008, entitled "Maintaining Data Consistency in Mirrored Cluster Storage Systems Using Bitmap Write-Intent Logging," Inventors: Chatterjee et al.
U.S. Appl. No. 12/013,116, filed Jan. 11, 2008, entitled "Maintaining Data Consistency in Mirrored Cluster Storage Systems With Write-Back Cache," Inventors: Chatterjee et al.
U.S. Official Action dated Jul. 28, 2008 in U.S. Appl. No. 11/551,303.
U.S. Official Action dated Mar. 20, 2009 in U.S. Appl. No. 11/551,291.
U.S. Official Action dated Mar. 27, 2009 in U.S. Appl. No. 11/695,673.
U.S. Official Action dated Aug. 17, 2009 in U.S. Appl. No. 11/551,303.
U.S. Official Action dated Oct. 5, 2009 in U.S. Appl. No. 11/551,291.
U.S. Official Action dated Jul. 8, 2009 in U.S. Appl. No. 11/551,311.
U.S. Official Action dated Dec. 28, 2009 in U.S. Appl. No. 11/551,311.
U.S. Notice of Allowance/Allowability dated Mar. 23, 2010 in U.S. Appl. No. 11/551,303.

* cited by examiner

ASYNCHRONOUS DATA REPLICATION

CROSS-REFERENCE TO RELATED APPLICATIONS

This application claims the benefit under 35 U.S.C. §119 (e) of co-pending U.S. provisional patent application No. 60/788,613, entitled "A Novel Method of Performing Snapshot-Assisted Replication of Data Between Two Servers," filed on Apr. 3, 2006, and co-pending U.S. provisional patent application No. 60/788,625, entitled "An Innovative Method of Asynchronously Replicating Data Between Two Servers," also filed on Apr. 3, 2006, both of which are expressly incorporated herein by reference in their entirety.

BACKGROUND

The value of data that is stored in a company's storage servers is often far greater than the value of the storage servers themselves. As a result, the loss of data in a disaster may be far more catastrophic to the company than the loss of the server hardware that stores the data. In fact, in some industries the loss of data on a large scale may signal the end of a company.

In an attempt to protect against a large-scale data loss disaster, companies often invest in storage technologies that geographically disperse data, such as by backing data up from one server computer to another remotely located server computer. In this way, a disaster at one data site will not destroy all of a company's data. Instead, business continuity can be restored from a geographically remote server computer where the data has been backed up.

The process of backing up data on-line from one server to another is called replication, or remote mirroring. The servers involved are traditionally called the "primary" and "secondary" servers, or the "primary" and "replica" servers. Replication differs from traditional off-line backups, such as tape backup, by virtue of being performed on-line, i.e., while a storage volume is fielding input/output operations ("I/Os") normally to clients. As data availability becomes more and more important, off-line backups are increasingly becoming archaic.

When a primary server fails disastrously, a system administrator has to restart the company's business from the secondary server. This is done manually, by remounting various volumes from the secondary server instead of the primary server, and restarting affected applications. This operation is called a "fail-over." When a fail-over occurs, the secondary server acts as the recipient of I/Os from clients. The cost of keeping a system running during fail-over may be higher due to the greater cost of the network connection to the secondary server. In many deployments, however, this cost is far lower than the cost of not doing business for the duration of disaster recovery.

When the primary server has been recovered, either by repairing it, recovering it, or installing a new server computer, the system administrator will most likely want to move control back to the primary server. The process of returning responsibility for fielding client I/Os to the primary server is called "fail-back." Fail-back is also done in a disconnected fashion, with volumes being reconnected and applications being restarted before I/Os are shipped back to the primary server.

In the replication context, two important measures have been defined to measure the effectiveness of a replication deployment. The first measure is defined as the duration of time that elapses between the failure of a primary server and the act of a secondary server taking over control by a fail-over. This is called the recovery time objective ("RTO"). The second measure is defined as the amount of data loss that is permissible during fail-over. In several situations, such as source code control for example, data loss of a few minutes is acceptable and can be recovered from without severe consequences. In other data storage scenarios, such as banking or airline reservations systems, a single second of data loss can cause irreparable damage. The amount of data loss that can be tolerated, measured in units of time preceding disaster, is called the recovery point objective ("RPO").

Different solutions have been built and deployed that attempt to provide an appropriate RPO and RTO for the particular data storage scenario. As an example, the costliest form of replication, but which has both an RPO and RTO of zero, is called active-active clustering/mirroring. In this form of replication, both the primary and the secondary servers are active and functioning at the same time; clients connect to both of the servers, and the servers maintain consistency with each other at all times. When a primary server fails, the secondary server seamlessly takes over the entire functionality of the system without necessitating a manual fail-over.

Another type of replication is referred to as synchronous replication. In a synchronous replication installation, only the primary server fields I/Os from clients. Every write operation that arrives to the primary server is also mirrored to the secondary server. The write is signaled to the client as being completed only when it has completed on both the primary and secondary servers. In this manner, applications are always guaranteed to have their writes written to both servers. If either the primary or secondary server fails, the non-failing server is guaranteed to contain all of the data stored on the failing server. The RPO of synchronous replication is, therefore, zero. It may, however, be necessary to manually fail-over a synchronous replication installation and, as a result, the RTO may be of the order of a few hours.

Synchronous replication deployments are expensive primarily because a high-speed connection is required between the primary and secondary servers in order to avoid adversely affecting performance. Where the primary and secondary servers are a great distance apart, on separate coasts of the United States for instance, the cost of a suitable high-speed connection may be prohibitive. In such applications, it may be desirable to utilize an asynchronous replication system instead. In an asynchronous replication system, I/Os are not sent from the primary to the secondary server inline with their arrival from clients. Rather, I/O operations are immediately written to the primary server and completed to clients, but are buffered at the primary server for a few seconds before they are transmitted to the secondary server.

Because data buffering improves bandwidth utilization, and because the buffered data may be compressed or otherwise optimized for size, the data communications link needed for asynchronous replication may be significantly slower and therefore less expensive than a link in a synchronous replication setup. The trade-off, however, is in the RPO. In previous asynchronous replication systems, any open buffers on the primary server at the time of a disaster will be lost. The secondary server, by virtue of being slightly behind the primary server, will exhibit this data loss to the clients. This is unacceptable in many types of storage installations.

Previous asynchronous replication systems also have difficulty maintaining write order fidelity. Write order fidelity refers the requirement by some types of applications that writes be completed in the order in which they are made to the primary server. In asynchronous replication systems, initiators are not directly in control of the order in which I/Os are sent to the secondary. Therefore, they cannot ensure that dependent writes are flushed in the correct order to the secondary server. Nonetheless, it is the responsibility of the asynchronous replication storage system to ensure that applications are able to recover smoothly from the secondary server if disaster strikes the primary server.

In most contemporary implementations of asynchronous replication, write order fidelity is maintained by collecting I/Os that are arriving at the primary server and sending the I/Os to the secondary server in exactly the same order, without any kind of framing or buffering. This process is guaranteed to ensure that write order fidelity is maintained. This process, however, eliminates the performance and bandwidth gains that asynchronous replication provides.

It is with respect to these considerations and others that the disclosure made herein is provided.

SUMMARY

Technologies are provided herein for asynchronous data replication. Through the implementations described herein, data stored on a storage volume maintained by a primary server computer is asynchronously replicated to a secondary server computer in a manner that ensures write order fidelity and, at the same time, retains the performance and bandwidth related benefits of asynchronous replication.

According to one aspect presented herein, a primary server computer maintains and exposes a storage volume for use by storage clients. The primary server computer also asynchronously replicates the data stored on the volume to a secondary server computer. The secondary server computer may be operated at a location that is geographically remote from the location of the primary server computer.

In order to replicate the contents of the storage volume to the secondary server computer, the primary server computer organizes incoming write operations into buckets. A bucket represents all of the write operations received at the primary server between a first point in time and a second point in time. A bucket is opened by the primary server at the first point in time and closed at the second point in time. The primary server may select the second point in time based upon the number of writes in each bucket, a predefined time period, or based upon an indication from an application program. According to aspects, the primary server may begin transmitting each bucket to the secondary server before each bucket has been closed. The secondary server, however, waits until an entire bucket has been received before writing it to its storage volume.

According to other aspects, the bucketing process performed by the primary server may be performed in conjunction with a write-back cache utilized at the primary server. In this implementation, pages of the write-back cache are utilized to create the buckets. A zero buffer copy mechanism may be utilized to create buckets from the pages of the cache without the overhead of a copy. By utilizing pages from a write-back cache, duplicate writes within each bucket are also eliminated.

The above-described subject matter may be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for asynchronous data replication. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. It should be appreciated that the program modules described herein may be implemented in a computer-readable media, such as volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer systems described herein. Those skilled in the art should also appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should also be appreciated that the embodiments presented herein may be utilized with any type of local area network ("LAN") or wide area network ("WAN").

Figure 1:
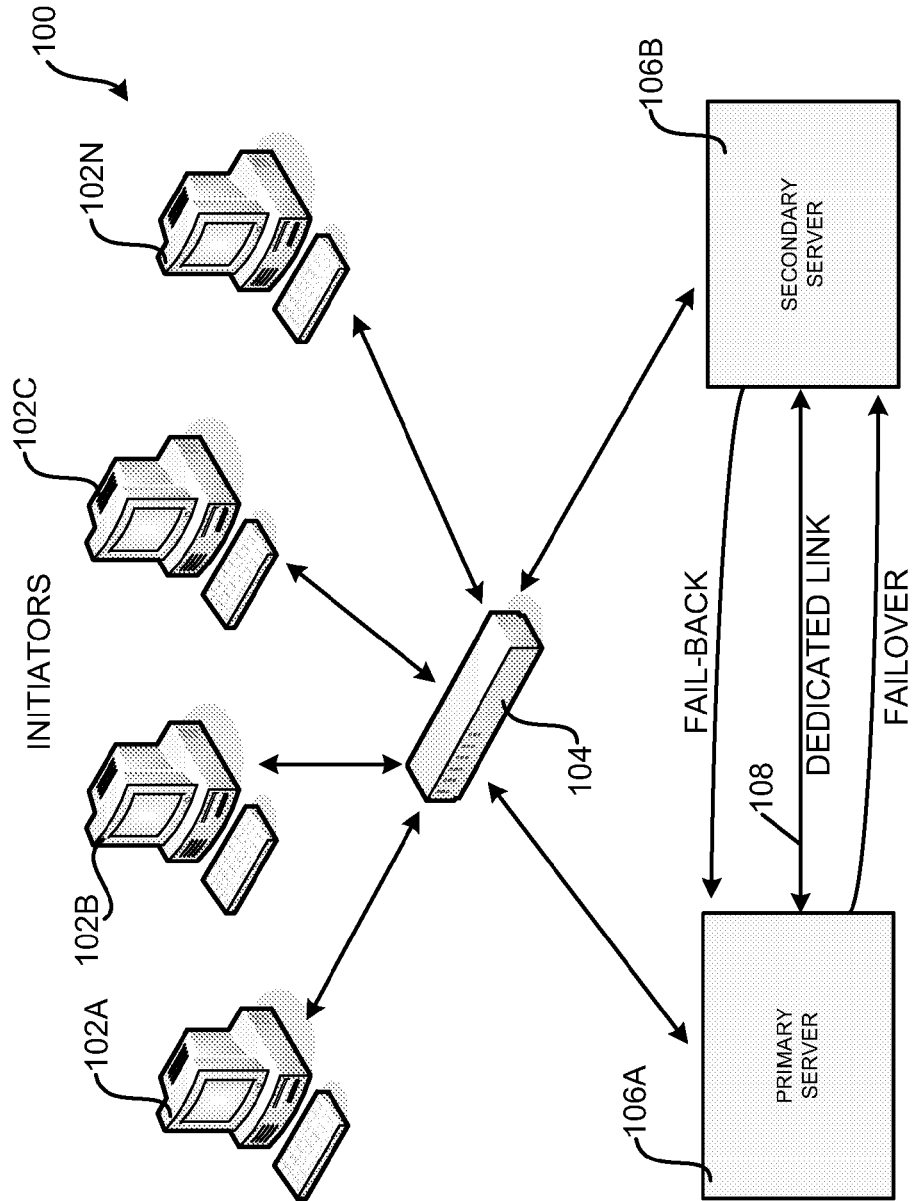
FIG. 1 is a network and software architecture diagram showing an illustrative operating environment for the processes and computer systems described herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for asynchronous data replication will be described. In particular, FIG. 1 is a simplified computer network architecture diagram illustrating one operating environment 100 for the subject matter described herein that includes one or more initiator computers 102A-102N ("initiators" or "clients"), a network switch 104, a primary server computer 106A, a secondary server computer 106B, and a network link 108 between the primary and secondary server computers. It should be appreciated that although one network switch 104 and four initiator computers 102A-102N have been illustrated in FIG. 1, any number of these computing devices may be present and utilized in the manner described herein.

According to implementations presented herein, the primary server 106A maintains storage volumes and fields reads and writes directed to the volumes from the initiators 102A-102N. The secondary server 106B acts as the backup repository for the data stored in the volumes maintained by the primary server 106A. The network link 108 between the primary and secondary server computers 106 may be established in various ways depending on the distance between the two computer systems and the permissible cost. For instance, according to embodiments, the link 108 may be established either over a dedicated network link, optical connection, or shared corporate network.

According to various embodiments presented herein, the secondary server computer 106B can be utilized in the event of a failure of the primary server computer 106A. For instance, if the primary server 106A fails disastrously, a system administrator can remount storage volumes from the secondary server computer 106B instead of the primary server computer 106A, and restart any affected application programs. This operation is called a fail-over. In fail-over mode, the secondary server computer 106B acts as the recipient of I/Os from the initiators 102A-102N directed toward the volumes. The cost of keeping the system shown in FIG. 1 running may be higher during fail-over (due to the greater cost of networking the initiators 102A-102N to the secondary server computer 106B); however, in many deployments, this cost is far lower than the cost of data unavailability during the duration of disaster recovery.

When the primary server computer 106A has been recovered, either by repairing or recovering it, or by installing new server hardware, the system administrator will return responsibility for fielding I/Os from the initiators 102A-102N back to the primary server computer 106A. This operation is similar to fail-over, but is called "fail-back." Like fail-over, fail-back is performed in a disconnected fashion, with volumes being reconnected and applications being restarted before responsibility for handing I/Os is returned to the primary server computer 106A. Additional details will be provided below regarding various processes provided herein for asynchronously replicating the contents of the data volumes between the primary server computer 106A and the secondary server computer 106B.

Figure 2:
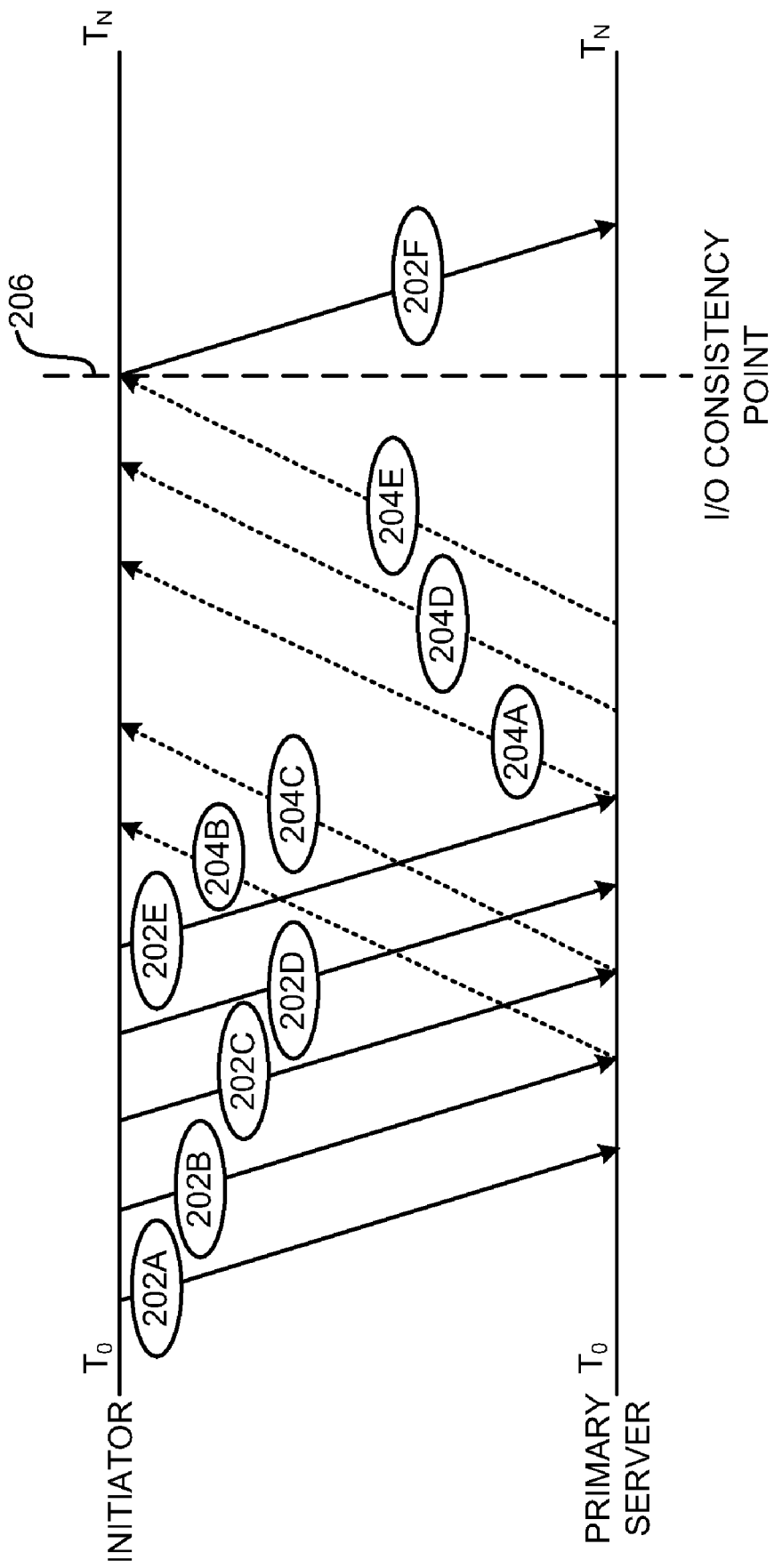
FIG. 2 is a data flow diagram showing an illustrative series of write and I/O completion operations between an initiator and a primary server in one embodiment described herein.

Referring now to FIG. 2, additional details will be provided regarding the embodiments presented herein for asynchronous data replication. In particular, embodiments presented herein utilize asynchronous replication to replicate the contents of a storage volume 110A maintained at the primary server 106A to the secondary server 106B, and vice versa. In an asynchronous replication system, such as the embodiments presented herein, I/Os are not sent from the primary server 106A to the secondary server 106B in line with their arrival from clients. Rather, I/O operations are immediately written to the primary server 106A and completed to clients, but are buffered at the primary server 106A for a few seconds before they are transmitted to the secondary server 106B.

As discussed above, previous asynchronous replication solutions suffer from an inability to maintain write-order fidelity, or implement write-order fidelity in a manner that eliminates the benefits of asynchronous replication. The embodiments presented herein provide technologies that are able to maintain write-order fidelity while also retaining the benefits of asynchronous replication. In particular, the embodiments presented herein ensure write-order fidelity by collecting write I/Os into "buckets" at the primary server 106A and transmitting the buckets to the secondary server 106B. A bucket represents all of the write operations received at the primary server 106A between two points in time. Guaranteeing write-order fidelity in the manner presented herein allows a storage system to be crash consistent. If an application executing on the system supports recovery from a power failure or crash, then the storage systems presented herein will not nullify that feature.

FIG. 2 illustrates how the process of bucketing ensures that write-order fidelity will be maintained according to the embodiments presented herein. In particular, FIG. 2 shows an illustrative collection of write operations 202A-202E presented in the time-order that they are transmitted from an initiator 102 and received at the primary server 106A. FIG. 2 also shows the completion operations 204A-204E indicating the time-order in which the write operations 202A-202E are completed to the initiator 102. Each of the completion operations 204A-204E corresponds to a respective write operation 202A-202E.

In the example shown in FIG. 2, the write operations 202A-202E are completed to an initiator 102 in a different order than they arrive at the primary server 106A. For instance, although the write operation 202A arrives at the primary server 106A prior to the write operation 202B, the completion operation 204B occurs prior to the completion operation 204A. Due to the process of bucketing write I/Os at an I/O consistency point 206 in the manner described herein, this does not affect the write-order for these operations at the secondary server 106B.

As will be described in greater detail herein, buckets are closed at an I/O consistency point 206, from where an application can recover. Each bucket holds the write I/Os that are performed on a volume between a bucket open and a bucket close. All write I/Os that are completed to an initiator 102 before a bucket close are made sure that they are in that bucket. Any write I/Os that are not completed to an initiator 102 will be kept in the next bucket. This ensures that the buckets have write I/Os that are consistent to the point in time at which the bucket is closed. Additional details regarding this process will be provided below.

Figure 3:
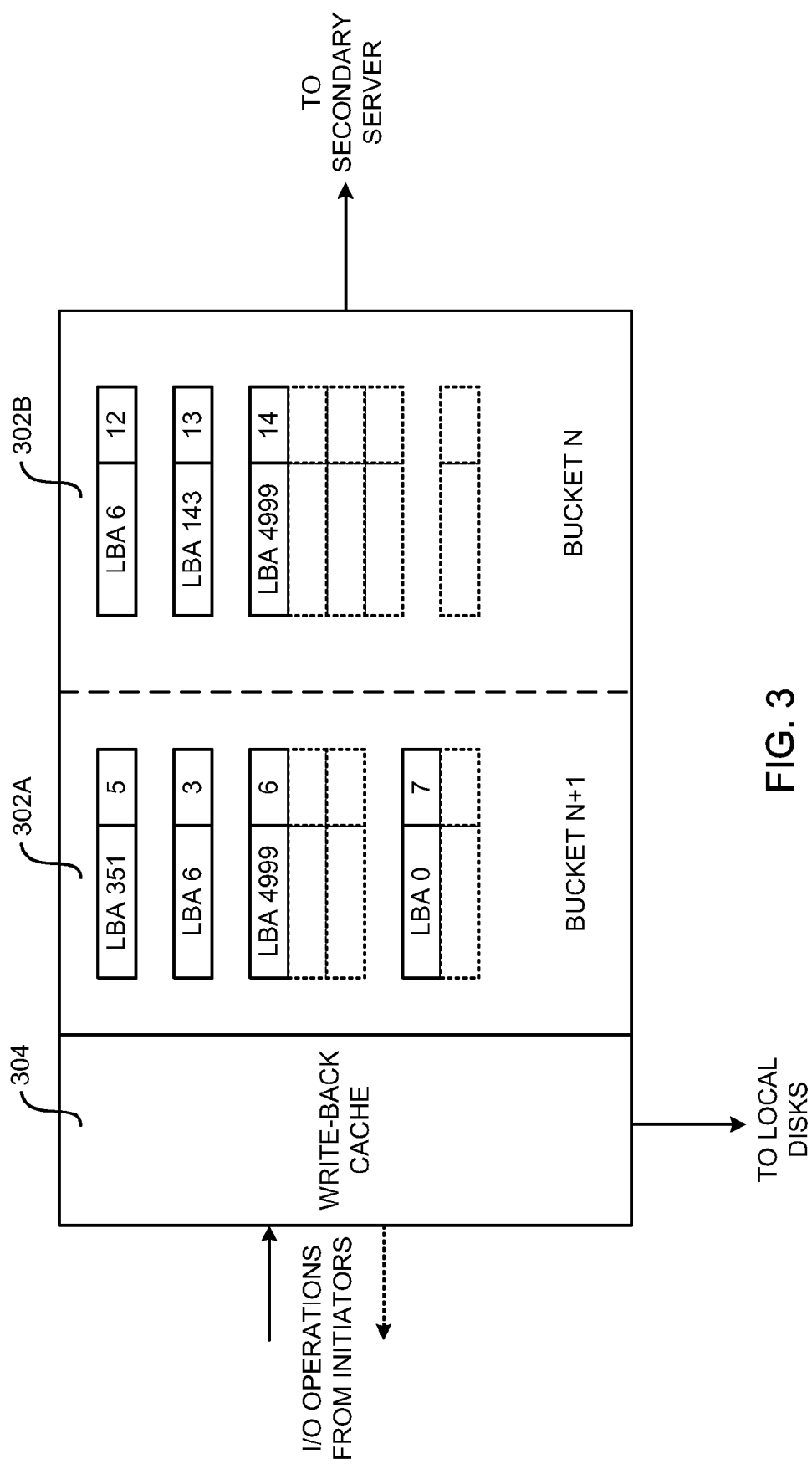
FIG. 3 is a software architecture and data structure diagram illustrating aspects of a bucket data structure utilized herein for storing data for replication to a secondary server in one implementation.

Referring now to FIG. 3, additional details regarding the bucketing process presented herein will be described. According to various embodiments provided herein, buckets may be maintained utilizing different mechanisms. One such mechanism writes each and every write I/O to a volume into a journal device at the primary server 106A. The initiator I/O will be completed when the data is written to the actual volume and also to the journal device. When the link 108 is available between the primary server 106A and the secondary server 106B, the data from the journal device is read and replicated to the secondary server 106B.

In one implementation provided herein, pages from the write-back cache 304 maintained at the primary server 106A are utilized as the journal device. Where a write-back cache 304 is utilized, write I/Os are completed to the initiator 102 as soon as the data is written into the cache 304. The actual write I/O on the volume will be performed at a later time when the cache 304 is flushed. If another write is received for a location already written to in the cache 304 before a flush is initiated, then the cache 304 will be updated and the I/O operation will be completed to the initiator 102. Finally, the data in the cache 304 will be written to the disk only once during the flush.

According to aspects presented herein, write I/Os are kept in the cache 304 for the remote backup storage and are flushed to the secondary server 106B at a slower rate as compared to the actual volume. Regardless of the cache setting on the source volume maintained at the primary server 106A, the data will be cached as buckets 302A-302B for the remote backup volume maintained by the secondary server 106B. Whenever the link 108 is available, the data in the buckets 302A-302B is transmitted to the remote backup volume at the secondary server 106B.

Using the cache 304 as the journal device allows duplicate writes within the same bucket to be consolidated. For instance, if there are duplicate write I/Os happening on the same volume within a single bucket, only the later-received write I/O is transmitted to the secondary server 106B. Since the secondary server 106B receives buckets in full and then flushes them fully into the volume, the volume maintained by the secondary server 106B will always have consistent data after a complete bucket flush. The cache 304, therefore, provides the advantage of eliminating the transmission of duplicate I/Os to the secondary server 106B, thereby better utilizing the bandwidth of the link 108. Moreover, because the buckets 302 are stored in memory that is also used by the cache 304, there is no data copy within memory from cache memory to bucket memory and vice versa. This leads to significantly lower CPU and memory utilization than previous asynchronous replication solutions. Additional details regarding the structure and contents of each bucket 302 is provided below.

As shown in FIG. 3, the cache 304 also maintains information about which bucket data is stored in. The buckets 302 are sequentially numbered. The cache 304 segregates all I/Os arriving from the initiator into the buckets 302. As discussed briefly above, a bucket is a complete collection of I/Os that share the property of having arrived at a server between two points in time. Hence, if three buckets exist, created at time 10, 20, and 30 seconds respectively, all of the I/Os that arrived at the server between 0 and 10 seconds are in the first bucket; all of the I/Os that arrived between 10 and 20 seconds are in the second bucket; and all of the I/Os that arrived between 20 and 30 seconds are in the third bucket. Hence, the end of each bucket is necessarily an I/O consistent point. So long as the secondary server 106B is synchronized with a particular bucket, the secondary server 106B is guaranteed never to contain out-of-order I/Os, and an application may always recover from it.

As will be described in greater detail below, I/Os are collected in the buckets 302 as long as there is cache memory available. While the I/Os are being collected the asynchronous transmit module flushes buckets to the secondary server 106B at the highest feasible rate. Thus, the cache 304 provides a bucket cushion for the I/Os to reside until they are fired to the secondary server 106B.

According to one implementation, the contents of the buckets 302 are transmitted from the primary server 106A to the secondary server 106B before they have been closed. The buckets, however, are applied at the secondary server 106B only after the buckets have been completely received. This allows utilization of the link 108 to be a constant, low value rather than burst, while at the same time maintaining write-order fidelity at the secondary server 106B.

Performance is further increased on the primary server 106A because transmission of each bucket 302 is performed by framing small I/Os together to form large I/Os. The larger I/Os are then transmitted to the secondary server 106B. As a result, the processors on the primary server 106A see far fewer interrupts than in the case of synchronous replication or other implementations of asynchronous replication. A consequence of reduced interrupts is the corresponding increase in CPU efficiency. Since the CPU utilization is lower, the performance of the primary server 106A is improved.

It should be appreciated that, according to embodiments presented herein, buckets may be closed and new buckets opened based on several criteria. First, a bucket may be closed based on the total size of the I/Os that it holds. Alternatively, a bucket may be closed based upon the amount of time that has elapsed since its creation. Since each bucket will always have I/O-consistent information, applications can recover from each bucket in the event of a fail-over regardless of the methodology used to determine when each bucket should be closed.

According to other implementations, buckets may be closed based on the actual checkpoints of an application server. In such an implementation, an application server can be requested to quiesce the data thereby generating a checkpoint. A bucket can be closed during such quiescing thereby making sure that the I/O-consistent recovery point is itself the application aware checkpoint. Application-aware checkpoints help in the proper recovery of applications in case of a fail-over to the secondary. Also, application-aware consistency points help in creating application-aware point-in-time snapshots. Snapshot events can be appended as part of a bucket, thereby making the snapshot events consistent across both the primary and secondary servers 106.

It should also be appreciated that, in actual usage, an application may use more than one volume. For instance, one volume may be utilized for data and another volume utilized for meta-data logging. In such scenarios, the application consistency point will be across all such volumes. If these volumes are asynchronously replicated to the secondary server 106B as individual volumes, the application server may not be able to recover from them even though the buckets are properly flushed. Since these volumes are treated as independent, buckets may be closed in them at different time intervals. The application server might see one of its volumes (a meta-data volume, for instance) ahead in time of the other (a data volume, for instance), and hence may not recover properly. This can be avoided by defining these volumes into a single consistency group.

A consistency group is a set of volumes for which all write I/Os within a given time period are kept in the same bucket. Whenever a set of volumes are grouped together into a single consistency group, all write I/Os to the volumes will be treated collectively. As a result, the write I/Os pertaining to the related volumes will be kept in the same bucket. The bucket meta-data will have enhanced information to notify which volume the particular zone of I/O belongs to. It should be appreciated that consistency groups further enhance the application-aware consistency points, such that the consistency is now maintained across all the volumes of the consistency group. Furthermore, events such as snapshots will be maintained across all these volumes, thereby providing a complete application-aware point in time snapshots.

Figure 4:
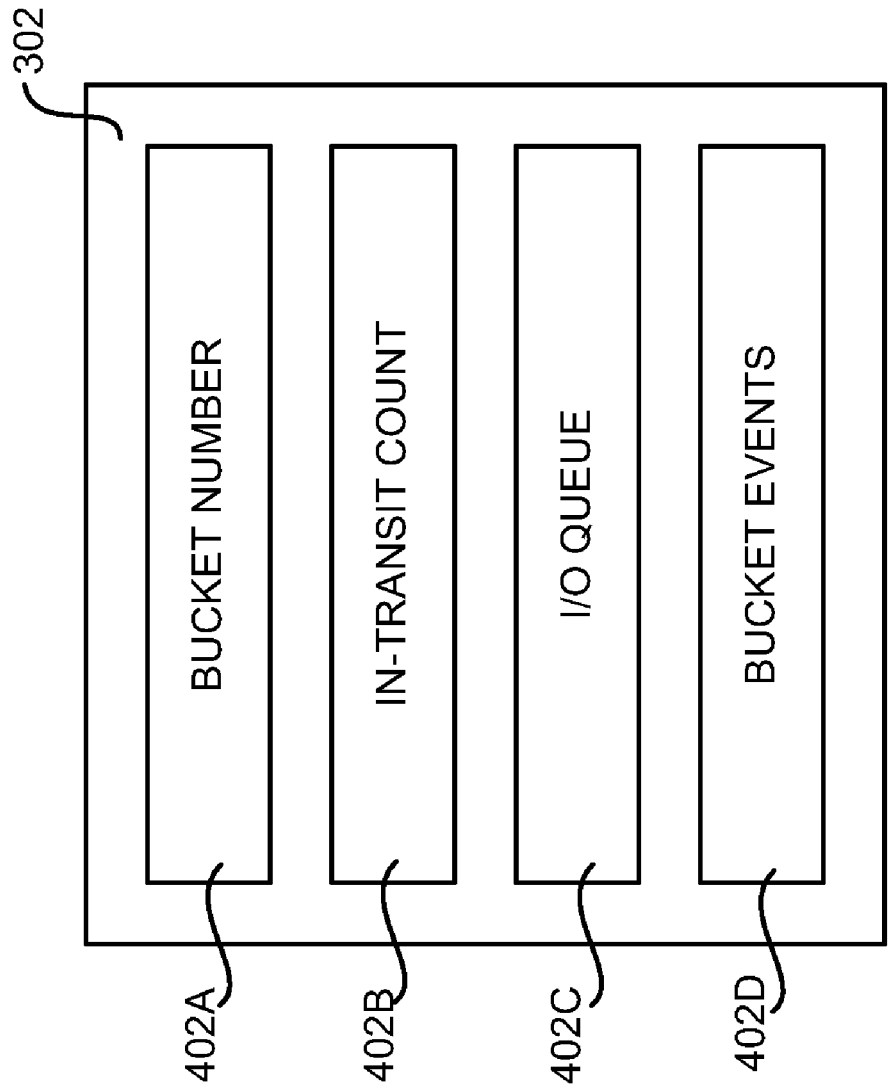
FIG. 4 is a data structure diagram showing an illustrative data structure for storing data relating to a bucket in one implementation presented herein.

Referring now to FIG. 4, an illustrative data structure utilized to store the contents of each bucket 302 will be described. As shown in FIG. 4, the bucket data structure includes a bucket number field 402A. The bucket number field 402A stores data identifying a number that is assigned to the corresponding bucket. Each bucket has a unique bucket number. The data structure shown in FIG. 4 also includes an in-transit count field 402B. The in-transit count field 402B is utilized to store data denoting the number of I/Os that have been accounted in the corresponding bucket but that are still dangling between the iSCSI and the cache. During such time a bucket cannot be closed, as it will lead to inconsistency. All dangling I/Os must be fully in the cache and the in-transit count must be zero before a bucket can be closed.

The data structure shown in FIG. 4 also includes an I/O queue field 402C. The I/O queue field 402C is utilized to store data identifying a queue of remote I/Os pertaining to the corresponding bucket. New I/Os are added to the tail of the queue, while an asynchronous transmit module, described below, takes I/Os from the head of the queue for flushing to the secondary server 106B.

The data structure shown in FIG. 4 also may include a bucket events field 402D. The bucket events field 402D is utilized by an event bucketing feature described herein for storing data regarding events related to a volume, such as snapshots. Through event bucketing, a bucket contains not only a complete collection of I/Os that happened during a given time period, but also events such as snapshot creation, snapshot deletion, and others. As a result, it is possible to take synchronized snapshots on both primary and secondary volumes, and perform a variety of management operations in a similar synchronized fashion. This allows the user to roll back, in the event of a failure, not just to an I/O consistent point, but also to an application-consistent point, thereby guaranteeing application recoverability.

Figure 5:
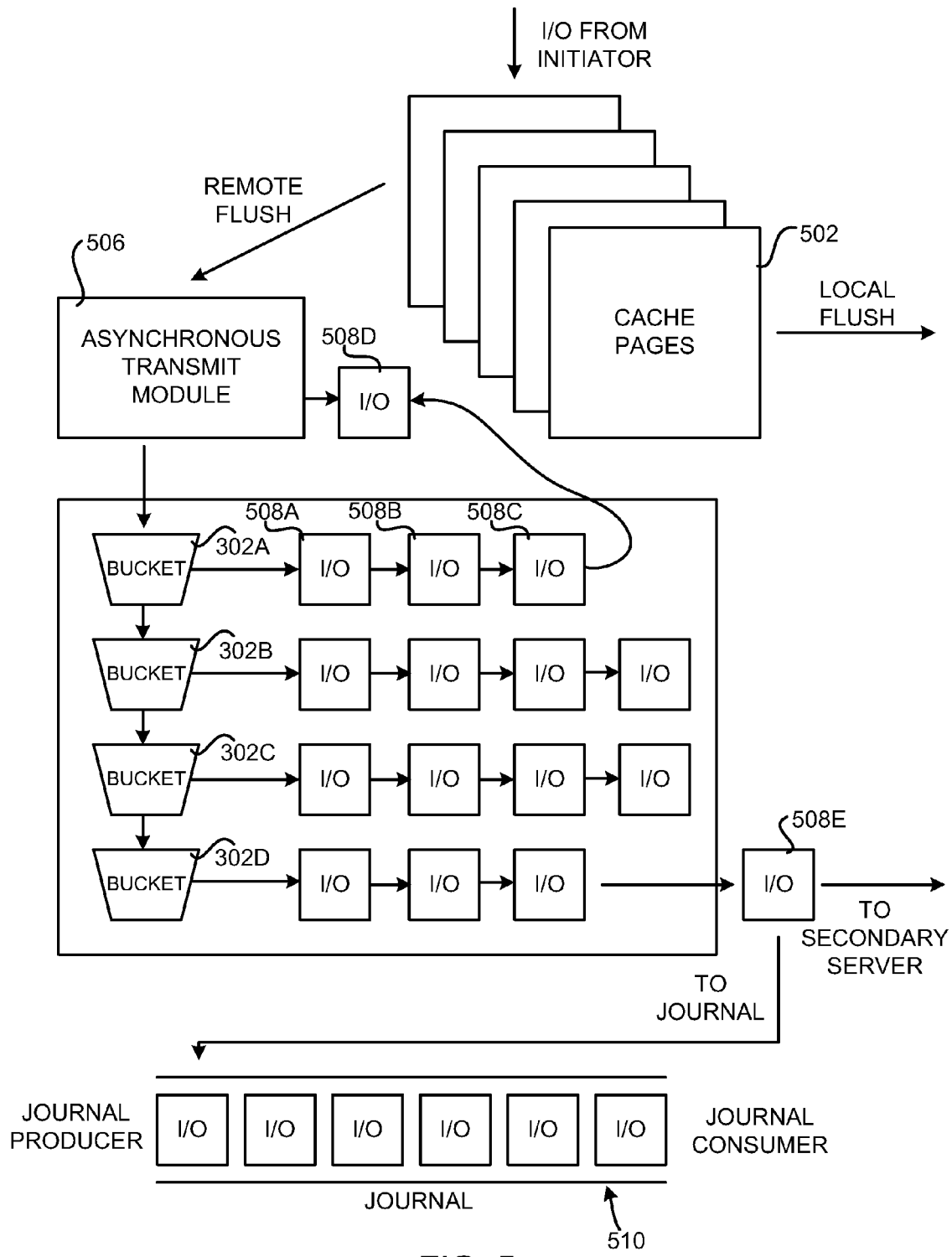
FIG. 5 is a software architecture diagram illustrating aspects presented herein for bucketing data for asynchronous replication to a secondary server in one implementation described herein.

Turning now to FIG. 5, additional details will be provided regarding one software architecture provided herein for asynchronously replicating data between the primary server 106A and the secondary server 106B. In particular, FIG. 5 shows a software architecture for bucketing I/Os at the primary server 106A and transmitting the buckets to the secondary server 106B. As shown in FIG. 5, I/Os are received at the primary server 106A from an initiator and stored in the cache pages 502. In one implementation, each cache page refers to one 64K of a volume (referred to herein as a "chunk"). Periodically, the contents of the cache pages 502 will be written to the volume maintained by the primary server 106A.

As shown in FIG. 5, an asynchronous transmit module 506 operates in conjunction with the cache to bucket I/Os for asynchronous replication to the secondary server 106B. In order to minimize memory usage and maximize performance, the asynchronous transmit module 506 utilizes a zero buffer copy mechanism to bucket the cached pages directly. In this manner, it becomes unnecessary to make a copy of the cache pages 502 during the bucketing process.

When the asynchronous transmit module 506 receives a new I/O, such as the I/O 508D, the asynchronous transmit module 506 determines whether a write has been previously made to the same area. If so, the new I/O may be stored within an existing bucket. If the new I/O does not correspond to an existing bucket, the new I/O may be placed in the current bucket. For instance, in FIG. 5, the new I/O 508D is being placed into the bucket 302A. When a bucket is full or other event occurs signaling that the bucket should be closed, the asynchronous transmit module 506 creates a new bucket. As also shown in FIG. 5, the I/Os 508A-508D are linked to the bucket 302A. This is accomplished using the I/O queue field 402C, described above with reference to FIG. 4.

The I/Os 508 remain in the cache until the asynchronous transmit module 506 flushes them to the secondary server 106B. In particular, the buckets 302 are arranged in a queue within each bucket 302 and flushed to the secondary server 106B by the asynchronous transmit module 506. The transmit module 506 handles one bucket at a time. The transmit module 506 takes I/Os from the tail of the queue and transmits to the secondary server 106B. I/Os may also be recorded in a journal 510. For instance, in FIG. 5, the I/O 508E is being flushed to the secondary server 106B and stored in the journal 510. As discussed above, in order to improve performance, multiple initiator I/Os may be accumulated in single I/O to the secondary server 106B. This will reduce the number of interrupts, as each I/O completion will be notified by a callback interrupt. The remote I/O also holds positional information about each of the individual contiguous I/Os that it holds.

The secondary server 106B receives the buckets 302 through a target module executing on the secondary server 106B. When the secondary server 106B receives the I/Os, it journals the I/Os into temporary disk storage. The I/Os are not written directly onto a volume because a single I/O might contain initiator I/Os of different times (within a bucket open and close). In this case, the secondary server 106B will become inconsistent until a complete bucket is received. If there is any interruption to the primary server 106A due to total failure the secondary server 106B would become unusable due to inconsistent data.

To avoid such inconsistencies, the secondary server 106B persists the received I/Os in temporary disk storage. This ensures to the primary server 106A that the data is persisted in the secondary server 106B in some form, and hence it can relinquish the I/O resources if necessary. Once a complete bucket is received, the secondary server 106B will flush the bucket completely to the volume. After the flush, the volume at the secondary server 106B will be consistent to the point at which the bucket was closed in the primary server 106A.

Figure 6:
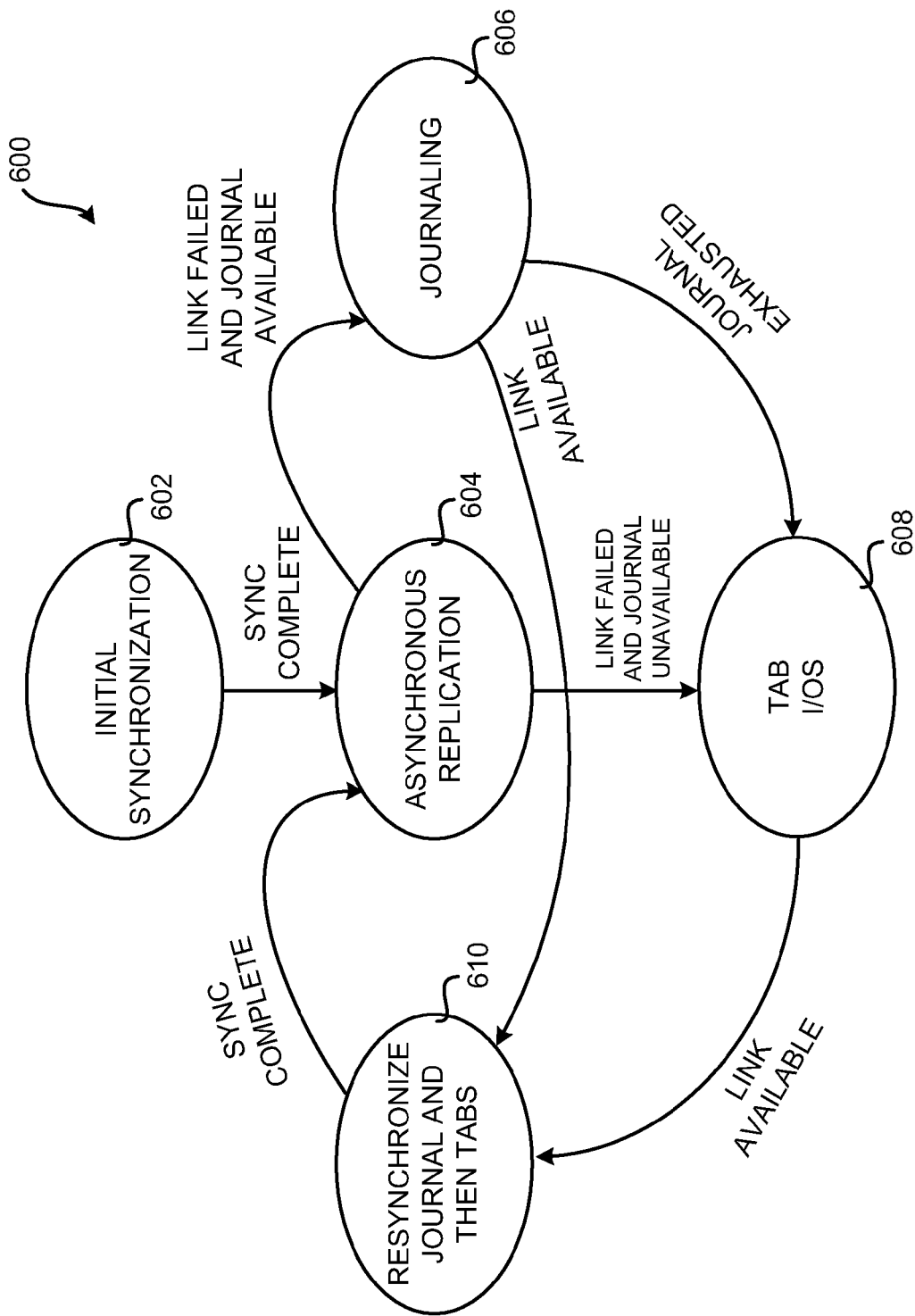
FIG. 6 is a state diagram showing an illustrative process for handling the failure of a communications link between a primary and a secondary server in one implementation presented herein.

FIG. 6 is a state diagram showing one illustrative process 600 performed by the primary server 106A to replicate data to the secondary server 106B and to handle the failure of the link 108. The process 600 begins at state 602, where an initial synchronization is performed between the volumes exposed by the primary server 106A and the secondary server 106B. Once the volumes have been synchronized, the process 600 transitions to state 604, where new writes received at the primary server 106A are asynchronously replicated to the secondary server 106B in the manner described above.

Intermittent failures of the link 108 are handled by queuing I/Os. Whenever there is a short time link failure, the remote I/O will fail. In this case, the transmit module 506 will hold the remote flush and wait for the link 108 to be restored. During this time, the transmit module 506 will continue to bucket I/Os in the manner described above. If the link 108 is restored within a relatively short period of time, the transmit module 506 will resume transmission. In this manner, incoming I/Os will be seamlessly queued in the cache as buckets and will not be affected by the short-term failure of the link 108.

According to embodiments, instrumentation is also provided to do a threshold to the incoming I/O when there is a link failure to the secondary server 106B or when the bandwidth of the link 108 is very poor as compared to bandwidth with the initiator 102. In this case, bucketing will continue until all of the available cache pages 502 have been depleted. After the cache pages 502 have been depleted, initiator I/Os will be held, thereby placing a hysterisis on the initiator I/Os.

If the link 108 remains unusable or degraded for a long period of time, the process 600 will transition to state 606 or state 608. State 606 will be utilized where space exists in the journal 510. If the journal 510 is unavailable, the process 600 will transition to state 608, described below. At state 606, incoming write I/Os to the primary server 106A are reflected in the journal 510. In this method, the transmit module 506 still collects buckets as described above, but instead of transmitting the buckets 302 to the secondary server 106B, the buckets are persisted in a separate, local storage journal 510.

Journaling I/Os in the manner described above provides the advantage of many I/O-consistent recovery points. When the link 108 is re-established at a later time, the buckets can be read from the journal 510 and then sent to the secondary server 106B. The secondary server 106B will receive these consistent buckets in the same manner as described above, without any knowledge that the buckets came from the journal. The secondary server 106B will receive the buckets in full, journal each bucket during the process of receiving, and then flush each bucket to its volume. In this scenario, the secondary server 106B will lag the primary server 106A by the number of buckets contained in the primary and secondary journals. But there will be more consistent points of recovery and hence fail-over operation can benefit. Journaling may be done by a user mode application so that compression, batch processing, and other operations may be performed.

If the journal 510 is unavailable or depleted, the process 600 shown in FIG. 6 will transition to state 608 where tabbing is employed. In this mode, bucketing of I/Os is discontinued. Instead, data is maintained within the primary server 106A identifying at a fine level of granularity the zones in which the primary server 106A and the secondary server 106B differ. This granularity may be maintained at 64K, matching that of the underlying RAID chunk size. Whenever an I/O happens to a particular 64K region, it is marked or "tabbed" in a bitmap. This bitmap is maintained by the primary server 106A for each entire volume at chunk granularity. Further writes to the same zone will not modify the bitmap and the entire volume will be represented by this fixed size bitmap.

When the link 108 has been restored, the process 600 transitions from states 606 or 608 to state 610. At state 610, the volumes at the primary server 106A are resynchronized with the volumes maintained at the secondary server 106B. The resynchronization operation reads chunk-sized data from the primary server 106A and transfers it to the secondary server 106B. Once a chunk is resynchronized to the secondary server 106B, the appropriate bitmap is cleared to mark that chunk as identical in both locations.

During such resynchronization, any new initiator I/O to the primary will also be synchronously replicated to the secondary storage. If a new initiator I/O is of chunk-sized data and it is on a chunk boundary, the new I/O is written to the secondary server 106B and the bitmap is cleared. This gives an added advantage of avoiding an additional chunk-sized read in the primary server 106A and the unnecessary transmission of old data. It should be noted that during a resynchronization operation, the secondary server 106B will be fully inconsistent with the primary server 106A. Until the resynchronization is complete, applications cannot fail-over to the secondary server 106B in the event of a failure in the primary server 106B. Once the resynchronization process has been completed, the process 600 transitions to the state 604, described above, where asynchronous replication continues.

Figure 7:
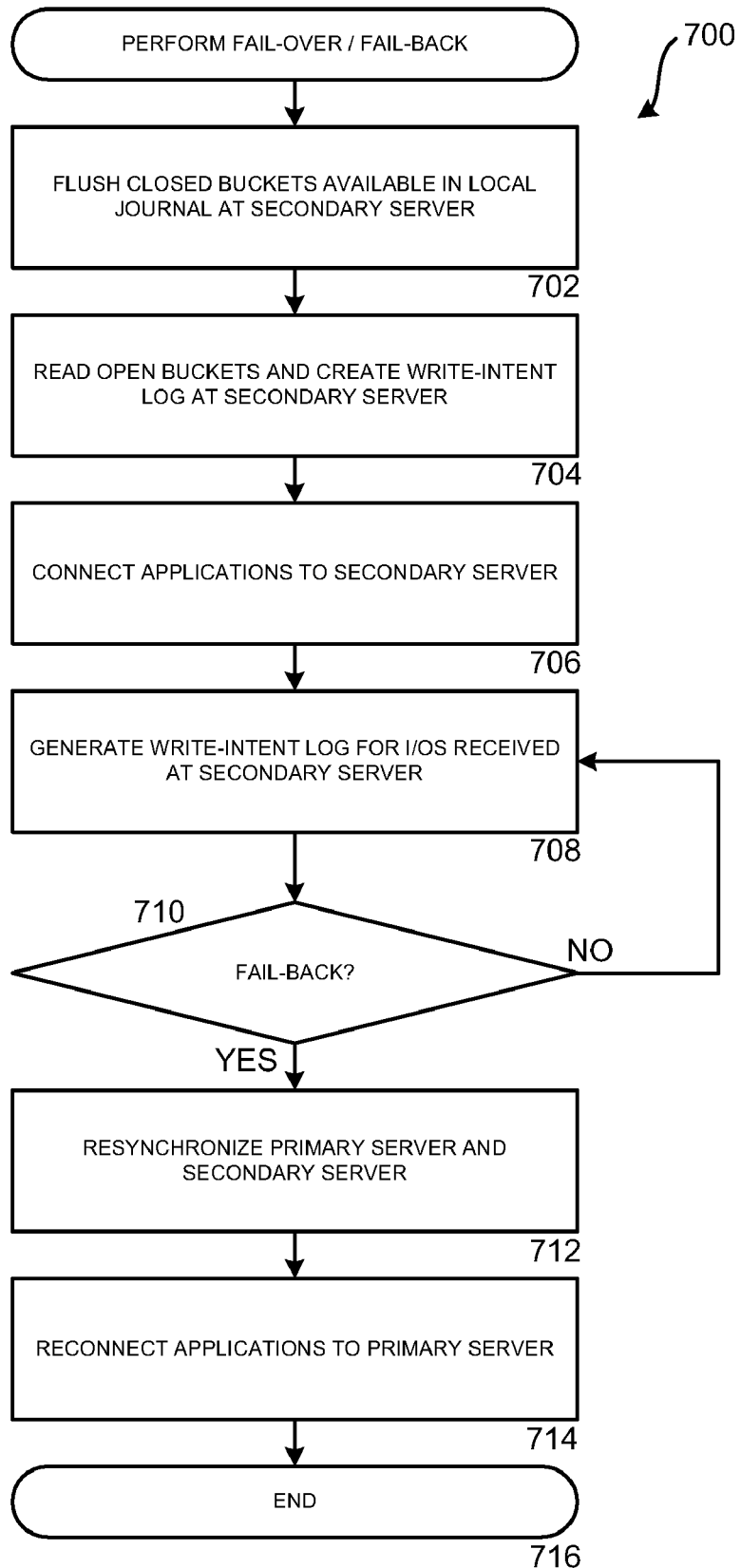
FIG. 7 is a flow diagram showing aspects of one process for failing a primary server over to a secondary server and for failing the secondary server back to the primary server in one embodiment described herein.

Referring now to FIG. 7, additional details will be provided regarding the embodiments presented herein for asynchronous data replication. In particular, FIG. 7 is a flow diagram showing an illustrative mechanism for failing the primary server 106A over to the secondary server 106B and for failing the secondary server 106B back to the primary server 106A. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and that the operations may be performed in a different order than shown.

In the event of a failure at the primary server 106A, a system administrator might want to fail over to the secondary server 106B. This is a disruptive operation since applications have to be connected to the secondary server 106B and recovered. The routine 700 illustrates this process. The routine 700 begins at operation 702, where the secondary server 106B flushes all closed buckets that are available in its local journal in order. Any open buckets present in the secondary server 106B represent the I/Os that are different between the primary and secondary servers that are known only to the secondary. Also, the I/Os contained therein will not have any consistency information since the bucket is still open. As a result, all of the I/Os contained in open buckets will be read and an exception table will be created through tabbing in the secondary server 106B. The open buckets are then discarded. This processing occurs at operation 704.

From operation 704, the routine 700 continues to operation 706, where applications are connected to the secondary server 106B. The applications are able to recover from the secondary server 106B since it has an I/O-consistent recovery point. Any further I/Os in the secondary will further generate exception bitmaps (tabs) in the secondary server 106B at operation 708. This indicates that the I/Os are available only in the secondary server 106B and not in the primary server 106A. It should be appreciated that there could be slight data loss due to a fail-over, since there could be outstanding buckets in the primary server 106A that are not transmitted to the secondary server 106B. Similarly, there could be an open bucket in the secondary server 106B that will be discarded during a fail-over.

When the primary server 106A is restored back from the failure and is ready for commissioning, it has to be failed back. Before such fail-back, the primary server 106A has to be resynchronized with the secondary server 106B. This occurs at operation 712. In particular, in order to resynchronize the primary server 106A, the primary server 106A will handshake with the secondary server 106B and understand that the secondary server 106B is actively handling initiator I/Os. The primary server 106A will then generate an exception table with the buckets that are available in the journal. This log will be added to the saved exception table to make a consolidated exception table in the primary server 106A. This table denotes the chunks that are different between the primary and the secondary servers during the time of fail-over, as known to the primary server 106A.

The primary server 106A will then transmit the generated table to the secondary server 106B. The secondary server 106B will consolidate the table with that of its own to generate a final table. The final table denotes the zones that are different between the primary and secondary servers as seen by both the primary and secondary servers. A gate, described below, will be generated with the table and persisted in the secondary server 106B. The table will then be cleared in the primary server 106A to indicate that it has been transmitted to the secondary server 106B. The secondary server 106B will then perform reverse synchronization from the secondary server 106B to the primary server 106A. The table will be cleared as and when they are resynchronized with the primary server 106A.

When the resynchronization fully completes, the primary server 106A qualifies for a complete fail-back. At this point, the administrator can decide to either fail-back to the primary server 106A or continue with the secondary server 106B fielding initiator I/Os. If a fail-back is requested, applications must disconnect from the secondary server 106B and connect back to the primary server 106A. Since it is a planned operation, the primary and secondary servers will have identical and consistent data and hence the applications can start where they stopped in the secondary server. The fail-back is now complete and volumes can now again go the bucketing mode and start to perform asynchronous replication. From operation 714, the routine 700 continues to operation 716, where it ends.

It should be appreciated that, in the event of an unexpected power failure in the primary storage, there is a chance that the bucketed data will be lost if it remains in cache alone and not persisted in the journal. This will result in the primary server 106A not able to proceed with bucketing further, as it has to resynchronize the lost data. Since the information about the difference is lost, it may lead a full resynchronization of the entire volume. This unexpected power failure is handled efficiently by a mechanism provided herein called gating.

Gating is a concept by which open write I/Os are maintained and persisted at a chunk (64K) granularity until they are either transmitted to the secondary server 106B or persisted in the journal. The gate is maintained as a bitmap. Open I/O zone are the zones in primary server 106A that may have different data as compared to that of the secondary server 106B.

A gate is opened when a write I/O is received at the primary server 106A on a particular chunk. The I/O will then be bucketed for transmission to the secondary server 106B in the manner described above. At a later time, the I/O will actually be transmitted to the secondary server 106B. The secondary server 106B will return the confirmation only after it is persisted into its journal. The gate on that zone will now be closed for that I/O. This is acceptable, since the I/O is persisted in the secondary server 106B and hence it can flush it at a later time, if need be. The gate will be kept open if there is any other I/O in the same chunk that is not yet transmitted. If journaling is enabled at the primary server 106A, then the gate can be closed when the journal write for that I/O completes. On power resumption, the transmit will first happen from the journal and then only on the active cached buckets. Hence, the consistency will be maintained.

Based on the foregoing, it should be appreciated that technologies for asynchronous data replication are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer system capable of asynchronously replicating data from a storage volume maintained at a first computer to a storage volume maintained at a second computer, the computer system comprising:
    a first computer configured to receive one or more write operations directed to the storage volume maintained by the first computer, cache the one or more write operations in a write-back cache, segregate the one or more write operations in the write-back cache into a bucket utilizing a zero buffer copy mechanism, and transmit the bucket from the write-back cache to the second computer asynchronously, wherein one or more duplicate write operations are eliminated in the write-back cache prior to transmitting the bucket to the second computer; and
    a second computer configured to receive the bucket at the second computer and apply the write operations in the bucket to the storage volume maintained by the second computer.

2. The computer system of claim 1, wherein the bucket comprises data in the write-back cache identifying write operations received at the first computer between a first point in time and a second point in time.

3. The computer system of claim 2, wherein the first computer is further configured to begin transmitting the bucket to the second computer prior to the second point in time.

4. The computer system of claim 3, wherein the second computer is further configured to apply the write operations in the bucket to the storage volume maintained by the second computer after the bucket has been completely received.

5. The computer system of claim 1, wherein transmitting the bucket from the write-back cache to the second computer comprises framing a plurality of small write operations into one large write operation.

6. A method for asynchronously replicating data from a first computer to a second computer, the method comprising:
    receiving at the first computer one or more write operations directed to a storage volume maintained by the first computer;
    caching the one or more write operations in a write-back cache of the first computer;
    segregating the one or more write operations in the write-back cache into a bucket utilizing a zero buffer copy mechanism;
    transmitting the bucket from the write-back cache to the second computer asynchronously;
    receiving the bucket at the second computer; and
    applying the write operations in the bucket to a storage volume maintained by the second computer, wherein one or more duplicate write operations are eliminated in the write-back cache prior to transmitting the bucket to the second computer.

7. The method of claim 6, wherein the bucket comprises pages of the write-back cache containing write operations received by the first computer between a first point in time and a second point in time.

8. The method of claim 7, wherein the first computer is configured to begin transmitting the bucket to the second computer prior to the second point in time.

9. The method of claim 8, wherein applying the write operations in the bucket to a storage volume maintained by the second computer comprises applying each write operation to the storage volume maintained by the second computer when the bucket has been completely received at the second computer.

10. The method of claim 9, wherein the second point in time is selected based on the number of write operations contained in the bucket.

11. The method of claim 9, wherein the second point in time is selected based on an amount of time that has passed since the first point in time.

12. The method of claim 9, wherein the second point in time is selected based upon data received from an application program.

13. The method of claim 6, wherein transmitting the bucket from the write-back cache to the second computer comprises framing a plurality of small write operations into one large write operation.

14. A computer-readable medium having computer-executable instructions stored thereon that, when executed by a primary computer, cause the primary computer to:

receive one or more write operations directed to a storage volume;

cache the one or more write operations in a write-back cache of the primary computer;

segregate the one or more write operations in the write-back cache into a bucket utilizing a zero buffer copy mechanism; and transmit the bucket from the write-back cache to a remote server computer asynchronously, wherein one or more duplicate write operations es are eliminated in the write-back cache prior to transmitting the bucket to the remote server computer.

15. The computer-readable medium of claim 14, wherein the bucket comprises pages of the write-back cache containing write operations received by the primary computer between a first point in time and a second point in time.

16. The computer-readable medium of claim 15, wherein transmitting the bucket to a remote server computer asynchronously comprises beginning the transmission of the bucket to the remote server computer prior to the second point in time.

17. The computer-readable medium of claim 14, wherein the write operations are stored in the buckets in a manner that ensures write-order fidelity of the write operations.

18. The computer-readable medium of claim 14, wherein transmitting the bucket from the write-back cache to the remote server computer comprises framing a plurality of small write operations into one large write operation.

* * * * *